United States Patent
Morin et al.

(10) Patent No.: US 12,453,913 B2
(45) Date of Patent: Oct. 28, 2025

(54) INTERACTIVE EXERCISE AND TRAINING SYSTEM

(71) Applicant: Liteboxer Technologies, Inc., Hampton, NH (US)

(72) Inventors: Jeffrey W. Morin, Exeter, NH (US); Todd A. Dagres, Boston, MA (US); Arvin G. Abadilla, Carlsbad, CA (US); Matthew A. Froncillo, San Diego, CA (US); Adam V. Hickerson, Oceanside, CA (US); Donald I. Lambe, Watertown, MA (US)

(73) Assignee: Liteboxer Technologies, Inc., Hampton, NH (US)

( * ) Notice: Subject to any disclaimer, the term of this patent is extended or adjusted under 35 U.S.C. 154(b) by 0 days.

(21) Appl. No.: 18/537,092

(22) Filed: Dec. 12, 2023

(65) Prior Publication Data
US 2024/0108961 A1    Apr. 4, 2024

Related U.S. Application Data

(60) Continuation of application No. 17/688,325, filed on Mar. 7, 2022, now Pat. No. 11,839,804, which is a division of application No. 16/188,128, filed on Nov. 12, 2018, now Pat. No. 11,266,894, which is a continuation-in-part of application No. 16/016,639, filed on Jun. 24, 2018, now Pat. No. 10,124,227.

(51) Int. Cl.
*A63B 69/32*      (2006.01)
*A63B 71/06*      (2006.01)

(52) U.S. Cl.
CPC .......... *A63B 69/32* (2013.01); *A63B 71/0622* (2013.01); *A63B 2220/833* (2013.01); *A63B 2225/50* (2013.01)

(58) Field of Classification Search
CPC . A63B 24/0075; A63B 69/0053; A63B 69/32; A63B 69/322; A63B 71/0622; A63B 2024/0068; A63B 2071/0625; A63B 2209/10; A63B 2220/40; A63B 2220/51; A63B 2220/833; A63B 2225/50; A63B 2225/74
See application file for complete search history.

(56) References Cited

U.S. PATENT DOCUMENTS

| | | | | |
|---|---|---|---|---|
| 4,974,833 A * | 12/1990 | Hartman | ............ | A63B 69/0053 482/84 |
| 8,011,222 B2 * | 9/2011 | Wiber | .................... | A63B 69/26 482/84 |
| 9,378,656 B2 * | 6/2016 | Cooper | .............. | G09B 19/0015 |
| 9,931,539 B1 * | 4/2018 | de Pablos | .......... | A63B 71/0616 |
| 9,943,742 B2 * | 4/2018 | Burt, Jr. | ............... | A63B 69/322 |

(Continued)

*Primary Examiner* — Joshua Lee
(74) *Attorney, Agent, or Firm* — David H. Judson

(57) ABSTRACT

A body supports a strike pad array. Each strike pad in the array comprises a force sensor to detect strikes, together with a plurality of light emitting diodes (LEDs) that are positioned around the force sensor and that are lit when the user strikes the pad accurately. Each strike pad has a connecting portion that includes a set of LEDs selectively lit to telegraph a hit point to the user, namely, the strike pad associated with the connecting portion. The LEDs arranged on the connecting portion serve as a runway with the LEDs being lit progressively outward toward the strike pad to be hit next in a programmed hit sequence.

9 Claims, 7 Drawing Sheets

(56) References Cited

U.S. PATENT DOCUMENTS

| | | | |
|---|---|---|---|
| 10,016,650 B2* | 7/2018 | Shaw | A63B 71/0622 |
| 2002/0098946 A1* | 7/2002 | Clark | A63B 69/222 |
| | | | 482/1 |
| 2005/0288159 A1* | 12/2005 | Tackett | A63B 69/22 |
| | | | 482/84 |
| 2006/0258515 A1* | 11/2006 | Kang | A63B 69/00 |
| | | | 482/83 |
| 2008/0125293 A1* | 5/2008 | Ng | A63B 69/32 |
| | | | 482/84 |
| 2009/0048069 A1* | 2/2009 | Sheedy | A63B 24/0006 |
| | | | 482/8 |
| 2011/0172060 A1* | 7/2011 | Morales | A63B 69/0053 |
| | | | 482/8 |
| 2014/0366645 A1* | 12/2014 | Tsai | G01L 5/0052 |
| | | | 73/862.041 |
| 2015/0179084 A1* | 6/2015 | Cooper | A63B 69/22 |
| | | | 434/250 |
| 2016/0367856 A1* | 12/2016 | DePompe | A63B 71/0622 |
| 2017/0021258 A1* | 1/2017 | Hoggatt | A63B 69/305 |
| 2017/0036087 A1* | 2/2017 | Codrington | B32B 9/025 |
| 2017/0312614 A1* | 11/2017 | Tran | G06F 3/00 |
| 2018/0178103 A1* | 6/2018 | Zhang | A63B 69/32 |

* cited by examiner

INTERACTIVE EXERCISE AND TRAINING SYSTEM

TECHNICAL FIELD

The subject disclosure relates generally to punching systems and methods with automated interactive components providing feedback for training and exercise.

BACKGROUND OF THE RELATED ART

Recreational punching bags have been in use for many years. More recently, manufacturers have been including sensors and electronic devices to detect and visually/audibly register strikes of particular targets on the punching bag. A typical boxing system of this type provides punching pads disposed on some structure for hand and/or foot punch by a user. Sensors are connected to the pads for detecting strikes, and a controller is coupled to each sensor. A display may also be provided to output video and audio, e.g., for strike training, or providing quantitative feedback of actual strike results to the pads. These systems may be integral to the punching bag or supported in other structures that are mounted on the bag. Control electronics in or associated with these systems also may suitably programmed or adapted to interact (e.g., via WiFi or Bluetooth) with connected computers or mobile devices, and training sessions may be gamified, e.g., by integrating music, lighting, and other interactive content.

BRIEF SUMMARY

An interactive system for exercise and training comprises a set of components. A primary component is a flexible housing adapted to be wrapped around or otherwise secured to a punching or kicking bag, wherein the housing supports a strike pad array positioned about a center portion. Each strike pad in the array comprises a force sensor to detect strikes, together with a plurality of light emitting diodes (LEDs) that are positioned around the force sensor and that are selectively controlled to be lit when the user strikes the pad accurately (e.g., within a predetermined strike zone, and within a predetermined time). In addition, each strike pad has associated therewith an extension (or connecting) portion that couples the strike pad to the center portion. The connecting portion advantageously includes a set of LEDs that are selectively lit to telegraph a hit point to the user, namely, the strike pad associated with the connecting portion. In particular, preferably the LEDs arranged on the connecting portion serve as a runway with the LEDs being lit progressively from the center portion and outward toward the strike pad to be hit next in a programmed hit sequence. As the user interacts with the system, speed, timing and accuracy preferably are measured to determine a score. The lighting elements are controlled using a controller unit that may be integral with the housing, attached thereto, or coupled to the housing remotely (e.g., via WiFi or Bluetooth). The controller unit includes processor-based (or electronics) suitably programmed by software (or otherwise configured) to output the programmed hit sequence (i.e., to provide the control signals that activate the LEDs), and to detect and record electrical signals generated by the force sensors as the user strikes the pads.

The foregoing has outlined some of the more pertinent features of the subject disclosure. These features should be construed to be merely illustrative. Many other beneficial results can be attained by applying the disclosed subject matter in a different manner or by modifying the subject matter as will be described.

DETAILED DESCRIPTION

Figure 1:
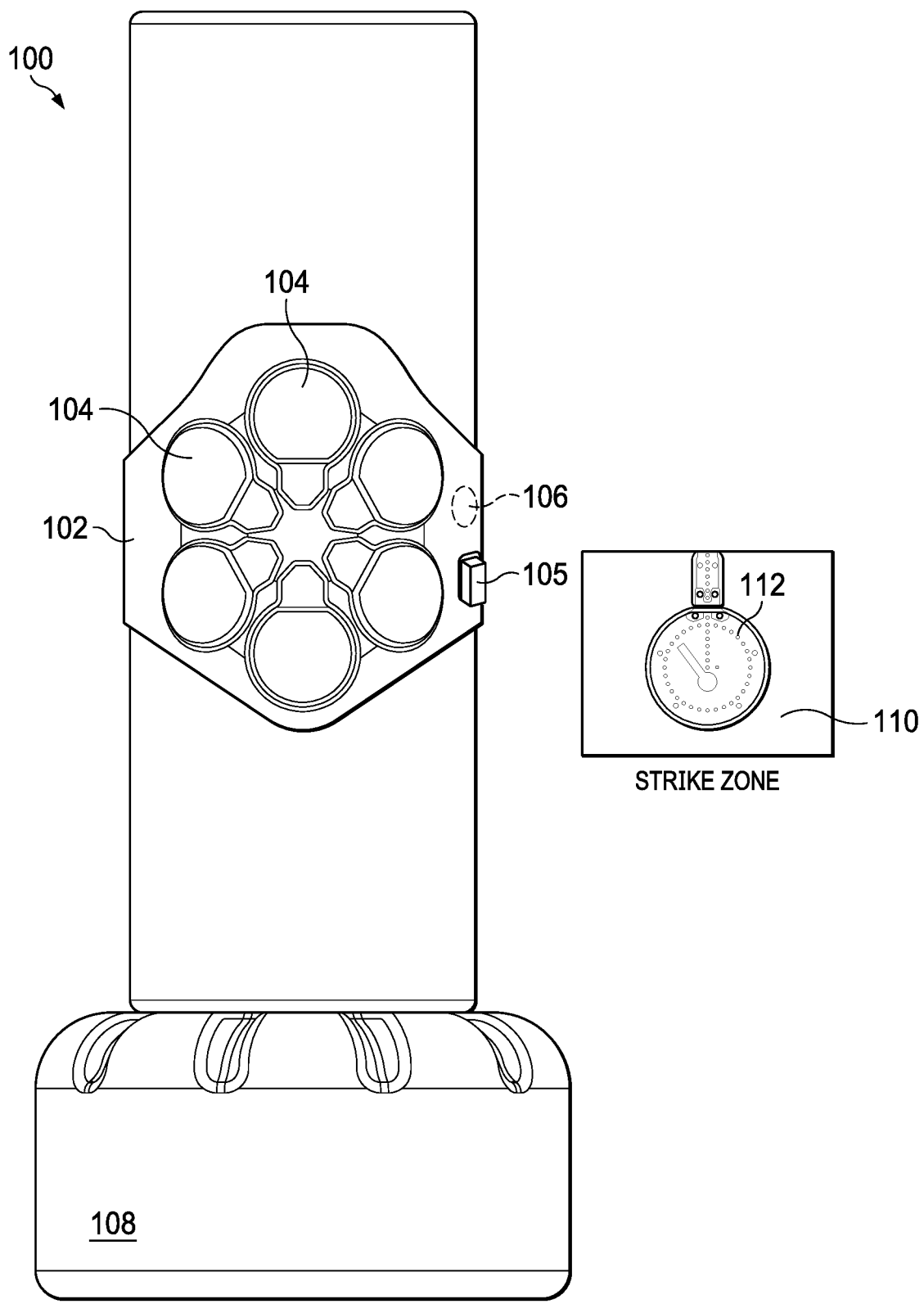
FIG. 1 depicts the interactive exercise and training system comprising a flexible body supporting a strike pad array mounted on a punching bag, together with an associated controller unit.

FIG. 1 depicts an interactive exercise and training system 100 comprising a body or housing 102 (sometimes referred to herein as a "wrap") supporting a strike pad array 104, together with an associated controller unit 105. A power button/indicator 106 is used to activate the controller. One or more fastening straps not shown are attached to or integral to the body 102 and are used to secure the flexible body to a punching or kicking bag 108. Typically, the interactive system is provided as an aftermarket or add-on to an existing bag 108, but this is not a limitation. The body 102 is made of a flexible material (cloth, elastomer, or the like) and, as such, is adapted to rolled up for ease of transport. When attached to the punching bag, the strike pad array 104 presents to a set of strike zones 110 to the user. Each strike zone 110 (one of which is shown) is defined by a strike pad that is selectively positioned to present a hit target. As will be described, each of the strike zones 110 includes an embedded force sensor, and a zone is lit by a set of embedded LEDs 112 that encircle the zone when the user strikes the zone with appropriate accuracy, force and timing. While a preferred body or housing is configured as a shield and designed to be wrapped around and supported on the bag as depicted, this is not a limitation, as the system may implement a different body configuration and one that is affixed to the punching bag with or without straps. The body configuration also may be integral or otherwise integrated with the bag or the bag covering.

Figure 2:
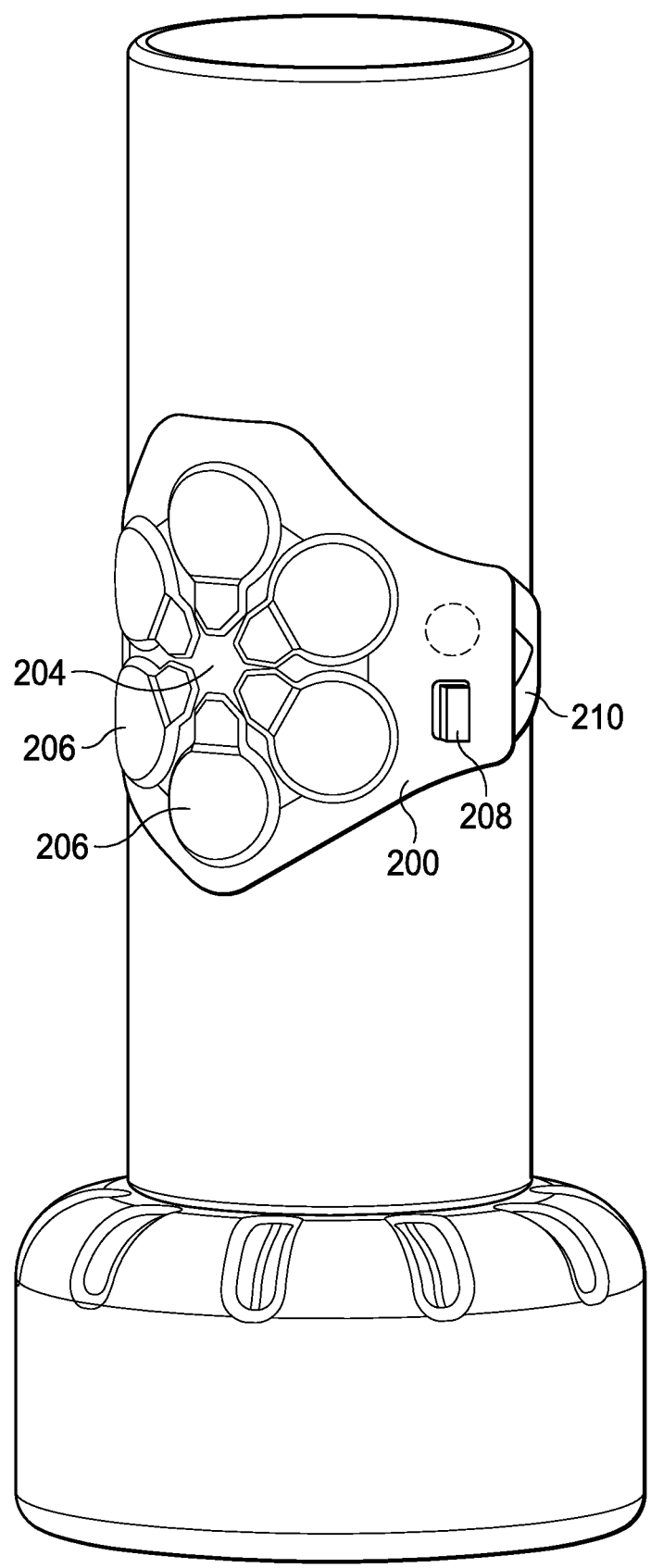
FIG. 2 depicts another view of the wrap as mounted on a punching bag.

FIG. 2 depicts another view of the wrap 200 that includes the strike pad array 204 with the set of strike pads 206, and the controller unit 208. As also depicted, a pair of Y-straps (one of which is shown at 210) are used to secure the wrap around the bag. Respective end portions of the straps support a fastener mechanism (not shown) such as a buckle, hook/loop assembly, a clasp or string assembly, or the like.

Figure 3:
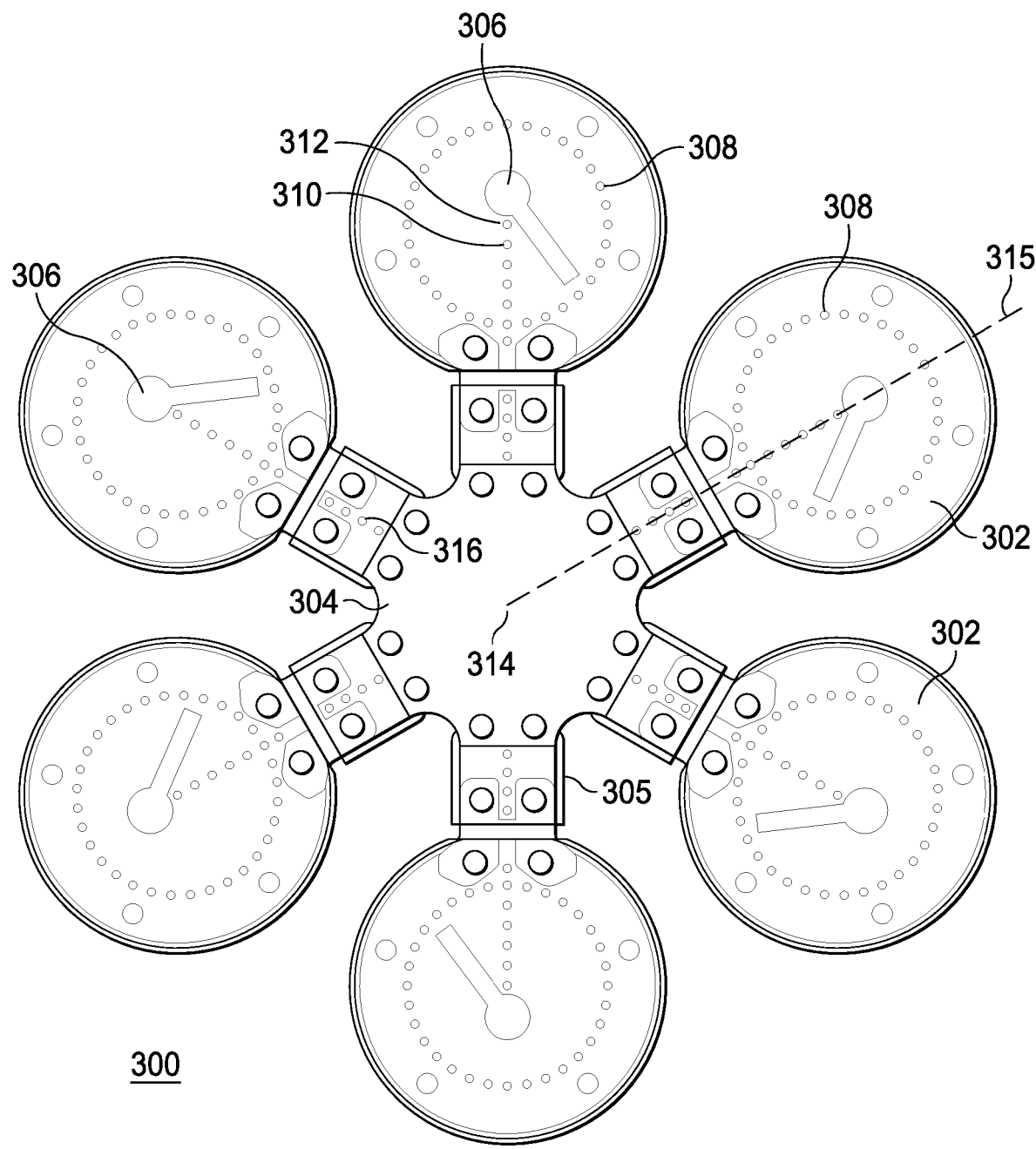
FIG. 3 depicts a preferred configuration of the strike pad array with covering removed to expose the lighting structures.
Figure 4:
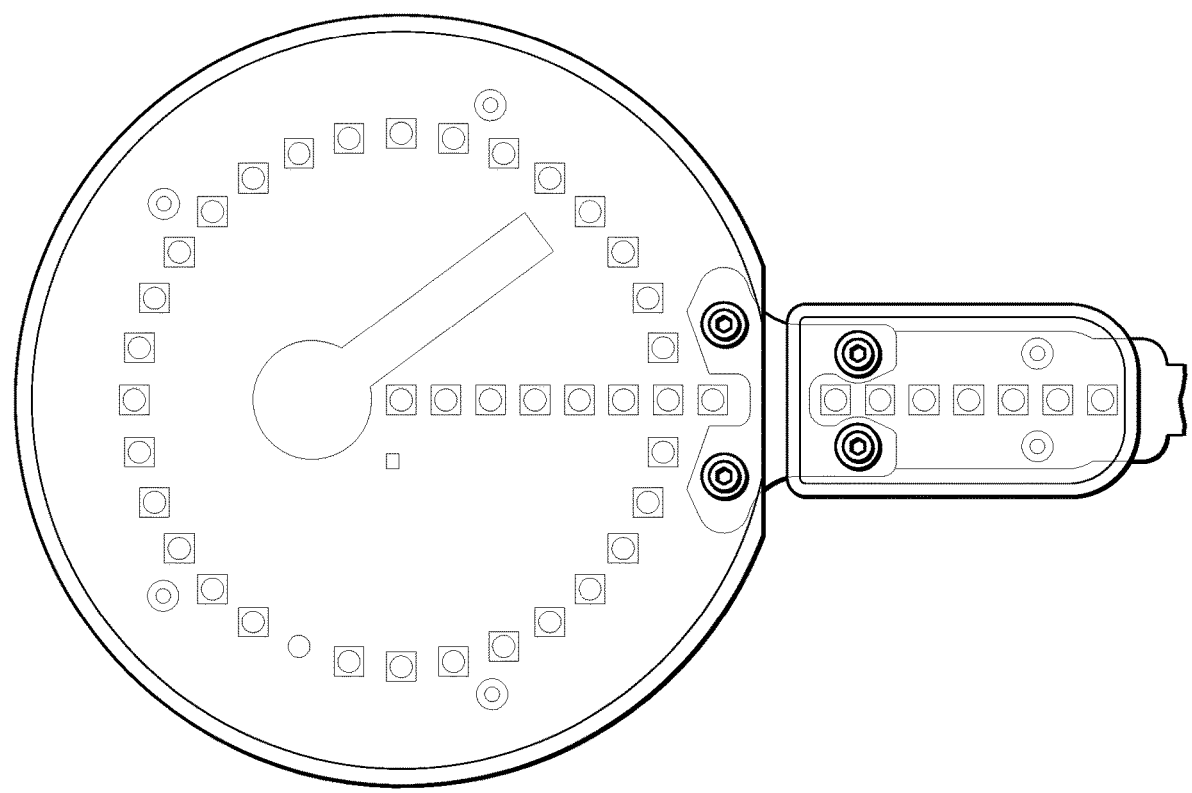
FIG. 4 depicts a single strike pad of the array together with its associated connecting portion that supports the runway lighting.

FIG. 3 depicts a preferred configuration of the strike pad array 300 with strike pad covering removed to expose the lighting structures in more detail. As depicted, in one embodiment, the strike pad array comprises a starburst (or hub and spoke) configuration comprising strike pads 302 selectively positioned about a center portion 304. Each strike pad 302 has associated therewith an outwardly-extending connecting portion 305. In an alternative embodiment, the strike pads and the center portion are integral. The connecting portion may be part of the strike pad, part of the center portion, or a standalone structure. As shown, each strike pad 302 comprises a force sensor 306 surrounded by a circular set of LEDs 308, together with an internal set of LEDs 310 arranged linearly from a center point 312 of the strike pad. The internal set of LEDs 310 are arranged along a line 315 that bisects the center point of a strike pad 302 and a center point 314 of the center portion 304 of the array itself. Each connecting portion 304 likewise includes a set of LEDs 316 arranged linearly, and LEDs 316 preferably are also aligned on line 315. FIG. 4 depicts this strike pad lighting arrangement in additional detail. As will be described, the LEDs 316 and 310 (from the center outward) are configured to provide an LED "runway" that is selectively activated to telegraph to the user that the associated strike pad should be hit. In other words, when the runway is activated, the LEDs light sequentially from the center out. Typically, this cueing occurs throughout a session (or portion thereof), with different strike pads thereby being selected identified (randomly, or in some programmed sequence) to the user. As the LED runway lights are activated, they cue (telegraph) to the user that the associated pad (at the end of the runway) should then be hit. More than one strike pad may be identified at the same time such that a pair of LED runways are lit concurrently to cue the user to hit two pads together with his or her left and right hands.

The starburst configuration of the strike pad array shown in FIGS. 3 and 4 is not intended to be limited. The number and orientation of the strike pads may be varied, and there may be more one center, although preferably the LED runway lighting structures are utilized in association with the strike pads to provide for enhanced play.

Control over the lighting sequence is provided by the controller unit 105, which as noted typically also receives signals generated by the force sensors 306. As the user interacts with the system, speed, timing and accuracy preferably are measured by the force sensors and the associated controller unit to determine a score or to provide other information. As noted above, the controller unit 105 may be integral with the housing, attached thereto (such as shown in FIG. 1), or coupled to the housing remotely (e.g., via WiFi or Bluetooth). As will be described in more detailed below, the controller unit includes processor-based (or electronics) suitably programmed by software (or otherwise configured) to output the programmed hit sequence (i.e., to provide the control signals that activate the LEDs), and to detect and record electrical signals generated by the force sensors as the user strikes the pads.

The controller unit 105 may be integrated with the strike pad array, as opposed to being a separate unit.

In one embodiment, a punch detection and measurement algorithm implements a moving threshold that filters the pressure reading from a force sensor; on a punch, the pressure reading changes rapidly and passes a threshold, and the algorithm determines the force to record preferably by taking a maximum value before the pressure reading returns below the threshold or a timeout occurs.

Figure 5:
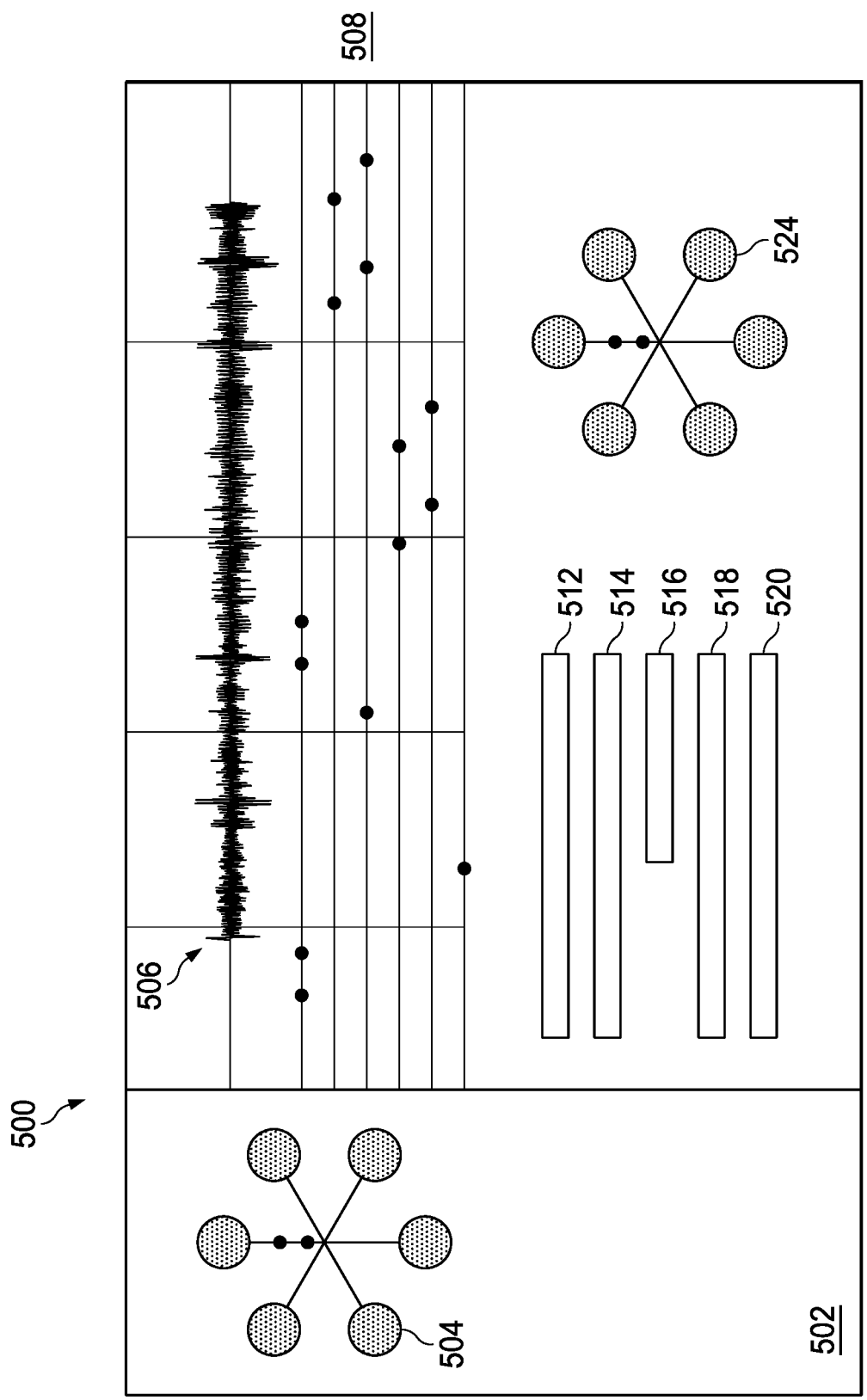
FIG. 5 depicts a user interface of a programming tool that is used to create a custom training session that associates a music source with a set of configured strike pad hit point locations and timing.

To facilitate gamification, the system preferably includes programming tools (e.g., a mobile device app, a desktop application, hardwired controls, etc.) to enable the user or other content provider (or indeed the system itself in an automated manner) to create a customize training or exercise session. Preferably, a custom session links together source audio (e.g., a music track), and a set of strike pad hit point locations and timing. FIG. 5 depicts a representative display interface 500 that may be used for this purpose. As shown, preferably the display 500 comprises a panel 502 that includes a representation 504 of the strike pad array as previously described. An audio file (whose waveform is depicted) 506 is imported into the interface and rendered along a timeline as depicted. Juxtaposed under the timeline is a grid 508 that includes a number of grid lines corresponding to a number of strike pads in the array. Using an input/output device, the user inputs strike pad cues on the grid lines, such that these cues are then selectively aligned (timed) to occur at various points in the audio. A navigation box (not shown) may be provided and includes a graphical representation of the entire selection, and the user can use a display tool within that box to navigate to particular portions of the audio selection, which are then represented above (by selectively expanding or compressing the audio file together with the underlying grid). An additional set of controls provide additional programming functionality. These include, for example, a dropdown field 512 by which the user can select one of a set of grids to display, an audio file import field 514, and a tempo selection field 516. A Spawn External Simulator button 518 can be selected to render a simulation of the programmed session, and a Save Punch Track button 520 can be selected to save the programmed session. Once saved, the user then recalls the session. The information comprising the session (typically the audio file and the set of programming) is then transmitted or otherwise provided (by hardwire connection) to the controller unit 105 and the session initiated. Display area 524 may be used to render a simulation of a programmed session. The audio file may be programmed to be rendered (output) in the user's mobile device, although the controller unit may include its own integral audio output system such as a speaker.

Machine or other learning may be applied to the system to provide for enhanced or more complex training sessions as the user increases his or her proficiency.

Figure 6:
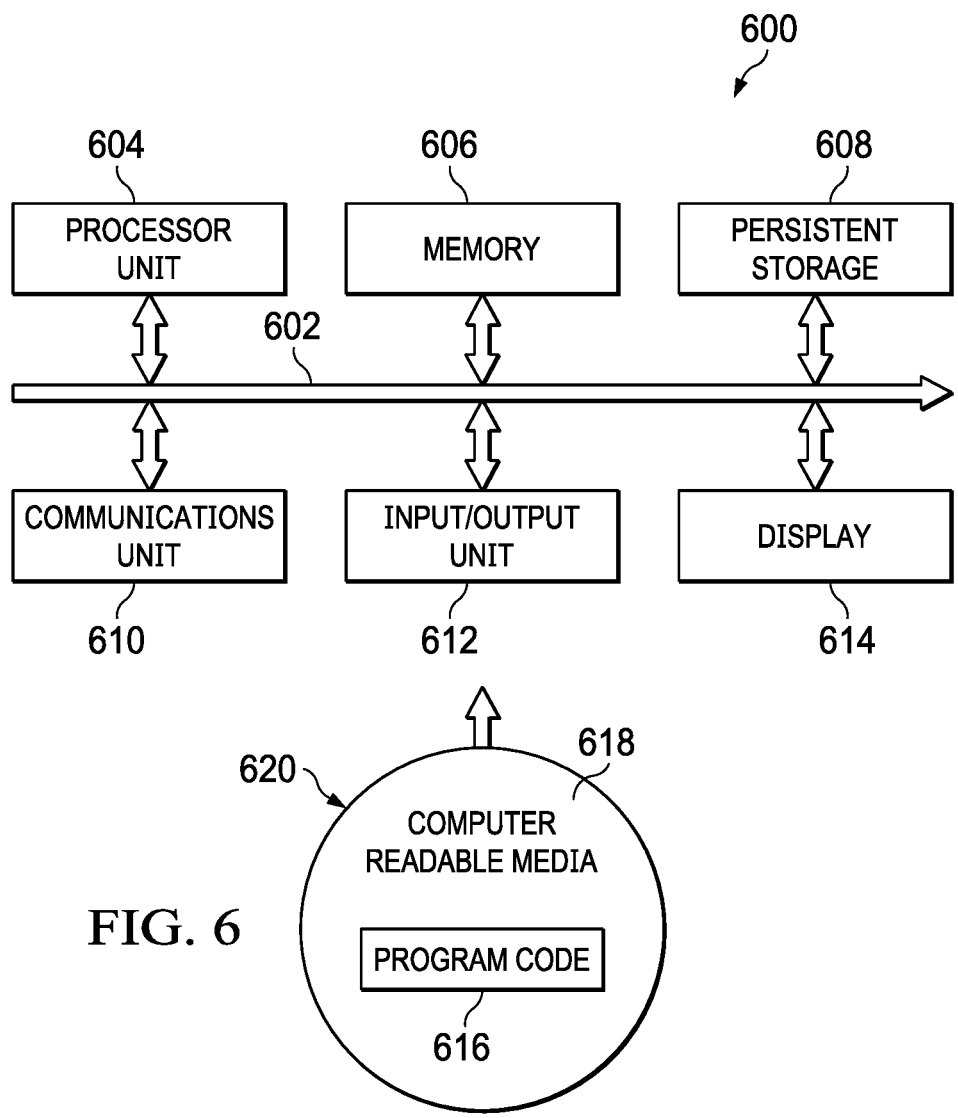
FIG. 6 depicts a representative controller unit architecture.

FIG. 6 depicts a representative software-based controller unit architecture. In a typical implementation, a controller on which the software executes comprises commodity hardware, an operating system, an application runtime environment, and a set of applications or processes and associated data, that provide the functionality of a given system or subsystem. In this embodiment, controller unit 600 comprises a communications layer 602, which provides communications between processor 604, memory 606, persistent storage 608, communications unit 610, input/output (I/O) unit 612, and display 614. Program code 616 is located on computer-readable media 618 that is selectively removable and may be loaded onto or transferred to the controller unit for execution by processor. Program code 616 and computer-readable media 618 form computer program product 620. An alternative to program-based control, the controller unit may include logic circuitry and other analog devices that provide the desired functionality (lighting control and force detection).

The interactive system of this disclosure also may include or utilize a client device for interacting with the controller unit. A client device typically is a mobile device, such as a smartphone, tablet (e.g., an iPhone® or iPad®) or wearable computing device. Such a device comprises a CPU (central processing unit), computer memory, such as RAM, and a drive. The device software includes an operating system (e.g., Apple iOS, Google® Android™, or the like), and generic support applications and utilities. Connectivity to the interactive system typically is via a management application (a mobile app) that may be downloaded via a mobile application storefront (e.g., the AppStore). The management application provides data management functions, connectivity to social networks, and interactivity. The display interface depicted in FIG. 5 may be implemented using the mobile app or a desktop application.

As an alternative to LEDs, other lighting devices (e.g., EL, LCD, incandescent, halogen, etc.) may be used.

There is no requirement that the wrap be used on a punching bag; the wrap may also be attached to a flat surface (e.g., a wall), or otherwise affixed to a support structure, or even a person (who would then in effect serve as the target).

The controller unit includes a power source, e.g., a battery, which may be removable for recharge or replacement.

Figure 7:
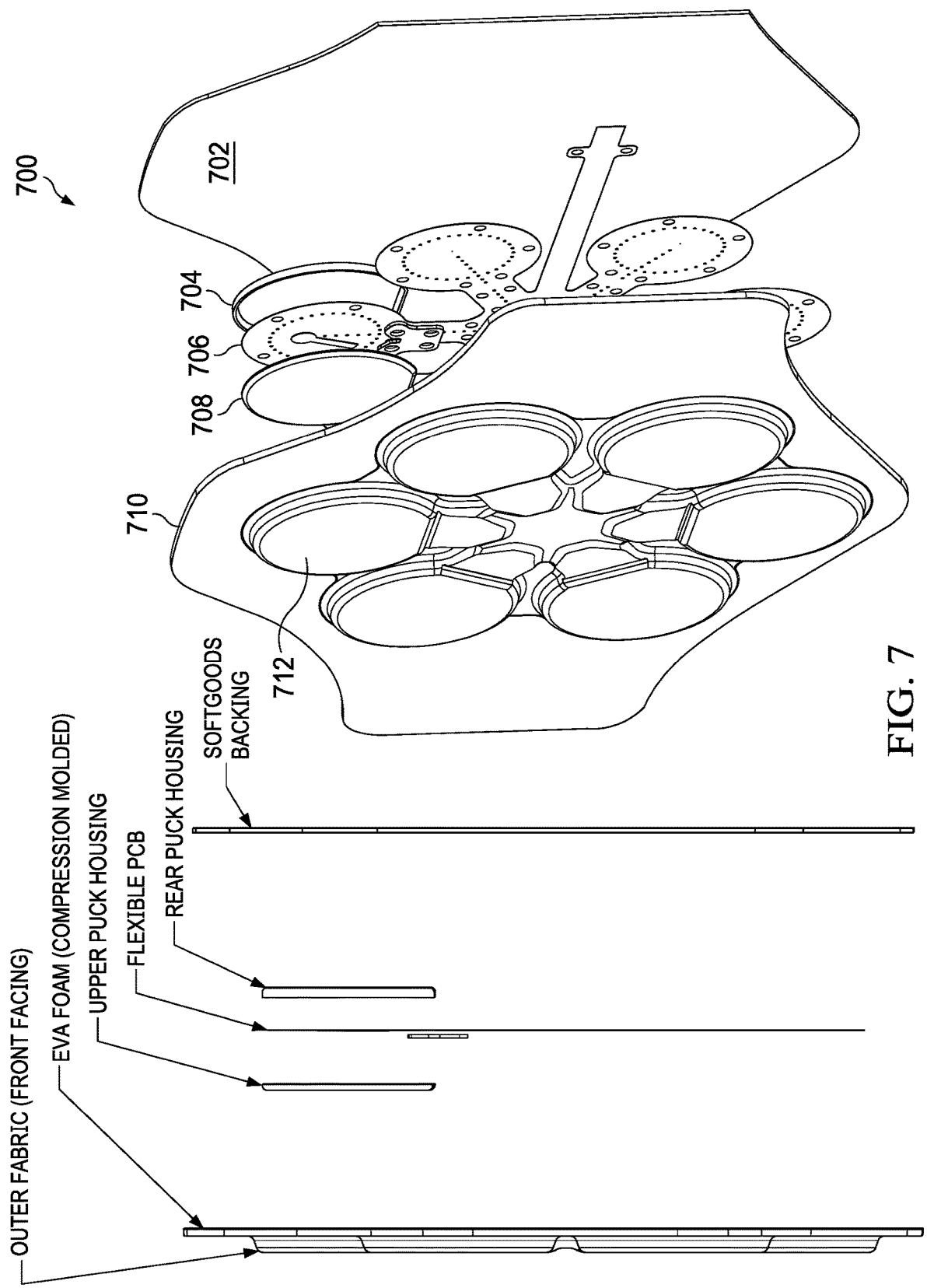
FIG. 7 depicts an exploded view of a preferred implementation of the wrap of this disclosure.

Preferably, the wrap comprises a stacked construction such as depicted in the exploded view shown in FIG. 7. In particular, the wrap 700 comprises the following layers from back to front: a fabric backing 702, a rear puck housing typically formed of hard plastic (for each sensor) 704, a flexible printed circuit board (PCB) 706 (such as depicted in FIG. 3), an upper puck housing (for each sensor) 708, a compression-molded foam layer 710 that absorbs the impact, and an outward facing front fabric layer 712. Layers 710 and 712 comprise a compression-molded front shield.

In addition to or in lieu of the force sensor (which typically is a resistive device), an accelerometer may be used to generate the hit detection.

In use, and to facilitate multi-player interactivity, the controller may be selectively programmed to capture and upload (e.g., by wireless transfer) hit data, exercise/training session data, scores, and the like, to multi-player gaming sites, other social media sites and the like. Such interactivity may include an instructor providing instructions (to users) via real-time or recorded audio/video. The instruction may include cues for punch location, timing and other exercises (e.g., push-ups, knee bends, etc.) during an interactive workout session. Instruction of this type can be given to multiple users, and their session results may then be used for competition or social sharing.

Having described our invention, we claim:

The invention claimed is:

1. A system, comprising:
a body comprising an array of strike pads selectively positioned to provide a set of hit targets, wherein each strike pad has associated therewith a set of indicator lights, and a force sensor, the set of indicator lights configured as a runway, the runway having a first end, and a second end that terminates at approximately a centerpoint of the respective strike pad; and
a controller unit communicatively-coupled to the array of strike pads, the controller unit configured to provide control signals to selectively activate the sets of indicator lights to telegraph a programmed hit sequence, and to receive electrical signals generated by the force sensors;
wherein the programmed hit sequence comprises a set of strike pad visual cues delivered via respective runways and synchronized in timed coordination with an audio file, wherein a given strike pad visual cue associated with a given set of indicator lights configured as the runway activates individual lights therein sequentially outward toward the centerpoint of the respective strike pad from the first end to the second end.

2. The system as described in claim 1 wherein the controller unit is further configured to transfer training session data, the training session data being derived at least in part from the received electrical signals generated by the force sensors.

3. The system as described in claim 2 wherein the training session data is associated with a user in an interactive training session.

4. The system as described in claim 1 wherein strike pads in the array of strike pads are selectively positioned in a starburst arrangement.

5. The system as described in claim 1 wherein the set of indicator lights associated with a strike pad are selectively activated in response to a strike pad visual cue.

6. The system as described in claim 1 wherein the set of indicator lights are light emitting diodes (LEDs).

7. The system as described in claim 1 further including a mobile device application for managing data generated in association with a training or exercise session.

8. The system as described in claim 7 further including an application that exposes a display interface for use in configuring an interactive training session.

9. The system as described in claim 8 wherein the display interface comprises a set of tools to enable a user to import and render a visualization of the audio file, and to input strike pad visual cues in association with the audio file.

* * * * *